United States Patent [19]

Jusionis et al.

[11] Patent Number: 5,221,818
[45] Date of Patent: Jun. 22, 1993

[54] BOX HEADER WELDING METHOD AND APPARATUS

[75] Inventors: Vytautas J. Jusionis, Fountain Valley, Calif.; William H. Fisher, Troy, Ohio; Randall T. Hensley, Cincinnati, Ohio

[73] Assignee: Hobart Brothers Company, Troy, Ohio

[21] Appl. No.: 766,584

[22] Filed: Sep. 27, 1991

[51] Int. Cl.⁵ .................................................. B23K 9/00
[52] U.S. Cl. ..................................... 219/61; 219/60.2
[58] Field of Search .................................. 219/60.2, 61

[56] References Cited

U.S. PATENT DOCUMENTS

| | | | |
|---|---|---|---|
| 2,908,805 | 10/1959 | Apblett et al. | 219/60.2 |
| 3,118,051 | 1/1964 | Dixon | 219/60.2 |
| 3,345,494 | 10/1967 | Apblett, Jr. et al. | 219/60.2 |
| 3,384,734 | 5/1968 | Jakobsson . | |
| 3,777,110 | 12/1973 | Yohn et al. | 219/60.2 |
| 3,946,191 | 3/1976 | Graham . | |
| 4,142,084 | 2/1979 | Torrani . | |
| 4,357,515 | 11/1982 | Kiefer et al. . | |
| 4,629,853 | 12/1986 | Yttergren et al. . | |

*Primary Examiner*—Clifford C. Shaw
*Attorney, Agent, or Firm*—Biebel & French

[57] ABSTRACT

A method and apparatus for welding tubes to a tube sheet uses a gas tungsten arc welding (GTAW) torch assembly that is small enough to be inserted through small access holes in a box header. The welding torch is carried near the end of a rotating mandrel that is supported for rotation within a stationary tube. A centering mechanism is inserted into the tube to ensure proper radial alignment of the welding torch with respect to the tube. At the other end of the mandrel is a mechanism for rotating the mandrel and for supplying electrical power, shielding gas and cooling water to the torch and wire to the weld. Axial spacing of the welding torch is provided by a tube stop device that temporarily engages the end of the tube in combination with an axial adjustment device. Once the mandrel is inserted into the tube to be welded, the adjustment device is brought into engagement with the header box wall, a stop lock collar is locked in place, and an adjustment ring is turned a specified amount to move the torch and the stop device axially away from the end of the tube. The torch is then energized and rotated about the joint to weld the tube to the tube sheet.

3 Claims, 5 Drawing Sheets

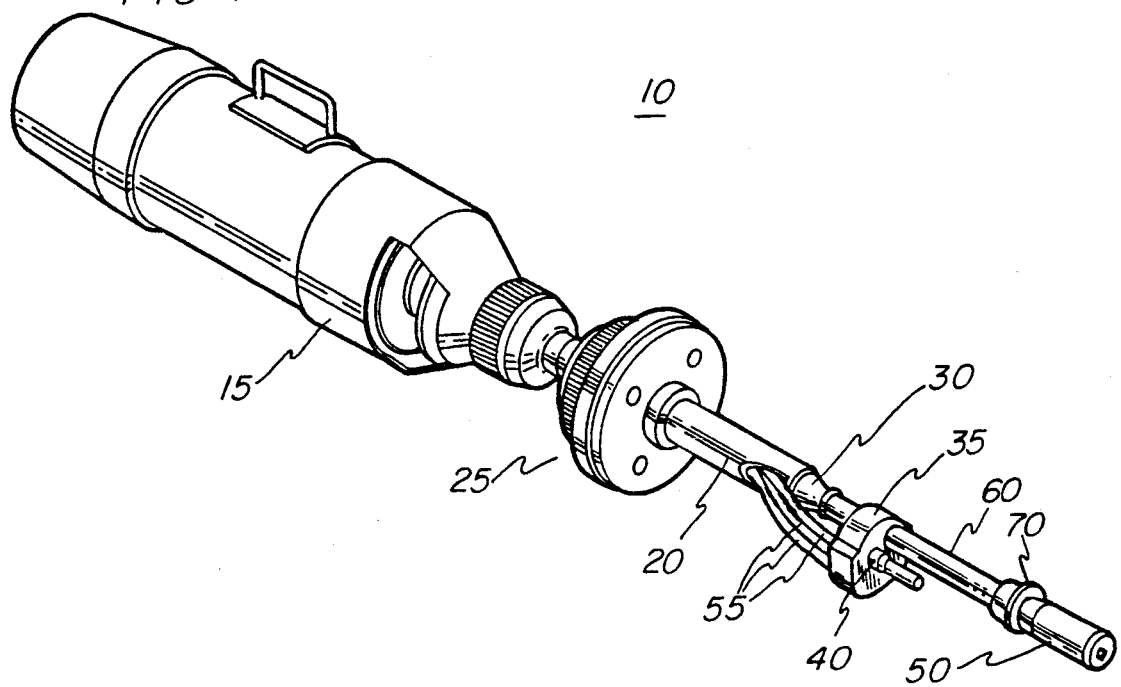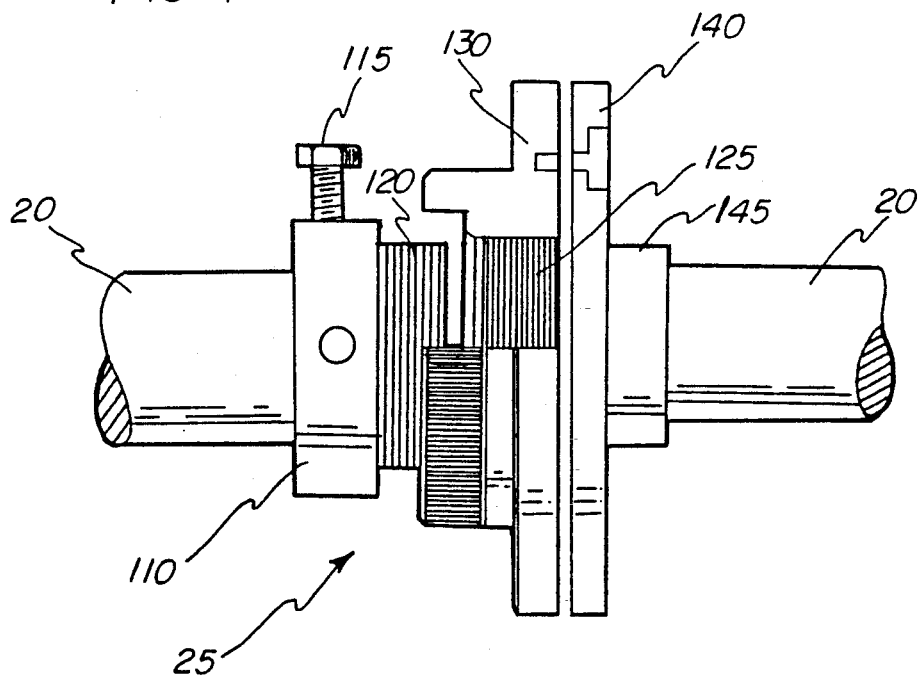

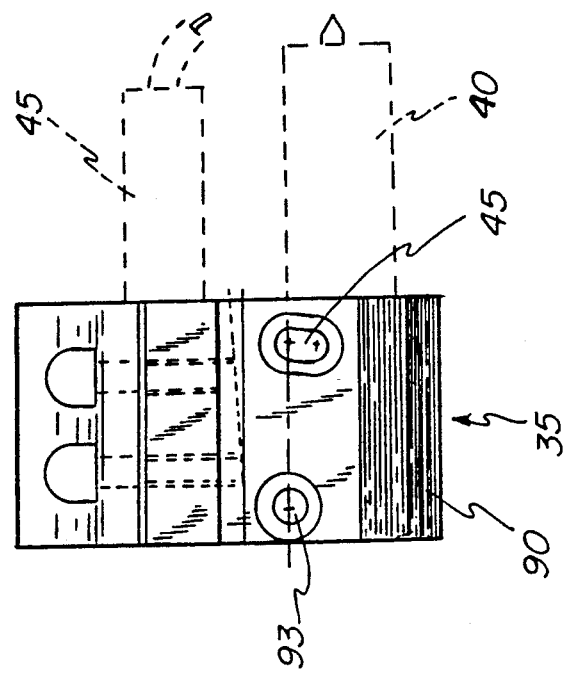
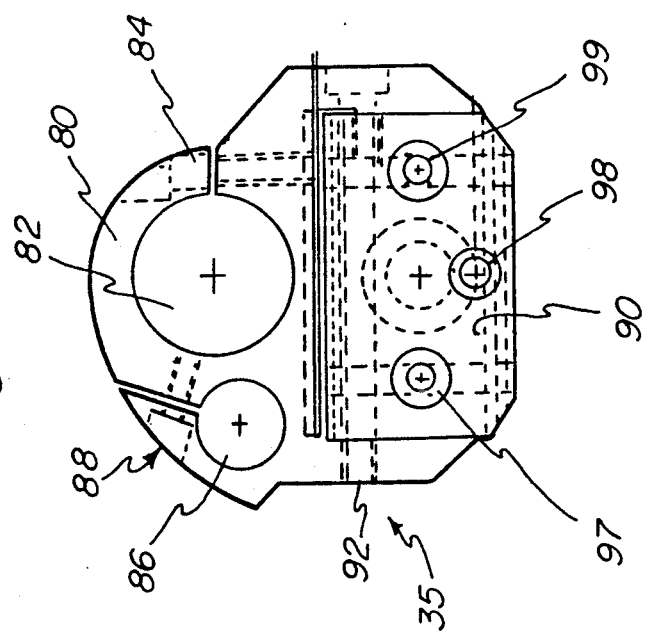

BOX HEADER WELDING METHOD AND APPARATUS

BACKGROUND OF THE INVENTION

This invention relates to a method and apparatus for welding tubes to a tube sheet.

Existing tube to tube sheet welding devices do not permit the automatic welding behind a header sheet through small access holes. Manual welding using stick electrodes result in low production rates and marginal weld quality.

Some examples of prior art tube to tube sheet patents includes U.S. Pat. Nos. 3,384,734, 3,946,191, 4,142,084, 4,357,515 and 4,629,853.

SUMMARY OF THE INVENTION

This invention relates to a method and apparatus for welding tubes to a tube sheet behind a header sheet that has been provided with small access holes.

In a preferred embodiment of this invention, an apparatus for welding tubes to tube sheets includes a welding torch that is small enough to be inserted through small access holes in a box header. The welding torch is carried by a torch block near the end of a rotating mandrel that is supported for rotation within a stationary tube. At one end of the mandrel is a centering mechanism that is inserted into the tube to ensure proper radial alignment of the welding torch with respect to the tube. At the other end of the mandrel is a mechanism for rotating the mandrel and for supplying electrical power, shielding gas and cooling water to the torch and wire to the weld.

The torch block is clamped on the mandrel and supports a TIG torch and a wire feeding tube. The radial position of the torch may be adjusted to accommodate tubes of different diameter.

Proper spacing of the welding torch from the end of the tube is provided by a tube stop device, a circular ring carried by the mandrel that temporarily engages the end of the tube, in combination with an axial adjustment device that engages the exterior of the wall of the header box. The adjustment device includes a stop lock collar that is slidable on the stationary tube but which can be clamped to the stationary tube. The stop lock collar is provided with external screw threads that cooperate with internal threads on an adjustment ring to provide for axial movement of the ring relative to the stop lock collar.

In operation, once the mandrel is inserted into the tube, the adjustment device is brought into engagement with the header box wall, the stop lock collar is locked in place, and then the adjustment ring is turned a specified amount to move the torch and the stop device away from the end of the tube, thus permitting it to be properly welded. The mandrel is rotated and the tube welded to the tube sheet. If a second welding pass is desired, the adjustment ring is turned a second specified amount to move the torch back from the weld, and the welding process is repeated.

It is therefore an object of this invention to provide a method of welding a tube to a tube sheet including the steps of placing a welding torch adjacent the end of a tube to be welded by inserting a mandrel carrying the torch into the end of the tube, moving the mandrel axially into the tube until the a fixed stop is engaged, thereafter moving the mandrel axially away from the end of the tube a predetermined distance to establish a predetermined torch-to-tube end spacing, and supplying power to the torch while rotating the mandrel.

It is another object of this invention to provide an apparatus for welding a tube to a tube sheet in a box header, the apparatus comprising a non-rotatable support tube, a mandrel supported for rotation within the support tube, centering means carried at one end of the mandrel for centering the mandrel when inserted into a tube to be welded to the tube sheet, stop means carried by the mandrel for locating the end of the tube to be welded, a welding torch assembly supported for rotation with the mandrel, the torch assembly including a welding torch and a wire feed tube, and means for adjustable positioning the welding torch axially with respect to the tube to be welded.

Other objects and advantages of the invention will be apparent from the following description, the accompanying drawings and the appended claims.

BRIEF DESCRIPTION OF THE DRAWINGS

FIG. 1 is a perspective view of the tube to tube sheet welding apparatus constructed according to this invention;

FIG. 5 is a front elevational view of a torch block for carrying the torch and wire nozzle on a mandrel;

FIG. 6 is a side elevational view of the torch block of FIG. 5; and

FIG. 7 is a side view, partly in cross section, showing the components comprising an axial adjustment device.

DESCRIPTION OF THE PREFERRED EMBODIMENT

Figure 2:
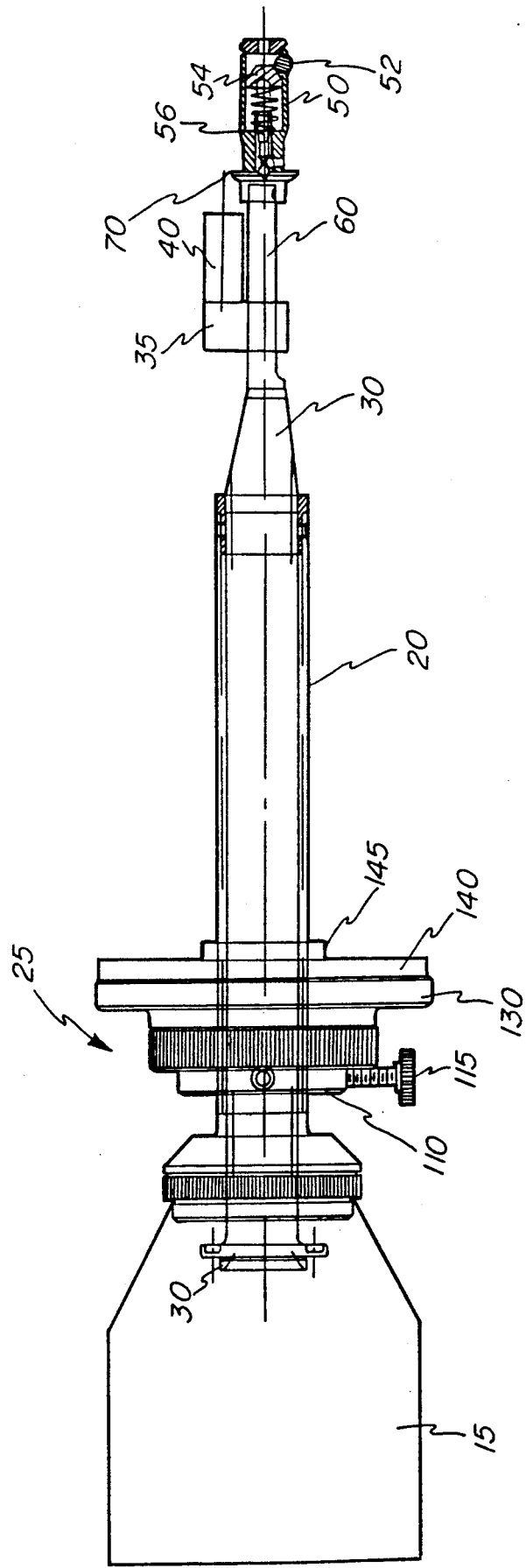
FIG. 2 is a side elevational view of the apparatus of this invention.

Referring now to the drawings which illustrate a preferred embodiment of this invention, and particularly to FIGS. 1 and 2, an apparatus for welding tubes to tube sheets is shown generally at 10 and includes a conventional weldhead 15, such as a Hobart model 214 weldhead, a stationary support tube 20, an adjustment device 25, a rotating tube 30, a torch block 35, a welding torch 40, a wire feed nozzle 45, a centering device 50, and a set of wire, water, gas and electrical supply hoses 55.

The weldhead mechanism 15 is provided with an outer case attached to the stationary support tube 20 and includes a means for rotating the tube 30 and for supplying electrical power, cooling water and shielding gas to the torch and wire to the weld. The weldhead mechanism may be of the type described in U.S. Pat. No. 4,142,084.

The adjustment device 25 is axially adjustable on the stationary support tube 20, as will be explained.

The rotating tube 30 is supported by bearings within and near each end of the stationary tube 20. A mandrel 60 is attached at the external end of the rotating tube 30 for rotation therewith. The stationary tube 20, the rotating tube 30 and the mandrel 60 are preferably made of stainless steel for durability. The mandrel is preferable provided with a coating or sleeve made of a high temperature insulating material, such as Teflon ®, to insure complete electrical isolation of the mandrel from the torch block 35. The hoses 55 exit through an opening near the end of the rotating tube 30.

The centering device 50 extends from the end of the mandrel 60 and is designed to be inserted into the end of the tube to be welded. The centering device is of conventional design and includes three steel balls 52 that are forced outwardly through equally spaced holes (smaller in diameter than the balls) in its outer sleeve by a frustoconical wedge 54 under action of a spring 56.

A stop device 70 is also attached to the end of the mandrel 60. This device is a circular plate having a diameter slightly under the outside diameter of the tube to be welded with machined out surfaces on the perimeter of the circular plate adjacent to the torch 40 for protection from the arc and directly opposite the said torch for entry clearance through the access hole in the header. This device will provide an initial location of the torch with respect to the end of the tube.

The torch block 35 is clamped on the mandrel 60 and supports a TIG torch 40 and a wire feeding nozzle 45. The torch block, shown in detail in FIGS. 5 and 6, includes a clamp body 80 having a central opening 82 for receiving the mandrel 60. A pair of clamp screws 84 secure the body 80 to the mandrel. An opening 86 receives the wire feed nozzle 45, which is clamped in place by screws 88.

A torch block 90 is supported in the body 80 by a pair of fulcrum screws 92 and set screws 94. As shown in FIG. 6, fulcrum screw 92 extends through circular opening 93 and a set screw 94 extends through an elongated arcuate opening 95. The torch block 90 is provided with an opening 96 for receiving the torch 40.

During initial set up, the radial position of the torch tip may be adjusted by rotating the block 90 and the distance of the torch from the weld is set by the axial location of the block relative to the stop device 70.

The block 90 is also provided with three countersunk openings 97, 98 and 99 into which are brazed special fittings for attaching receiving the hoses 55, two for carrying cooling water and electrical current, and one for shielding gas.

Referring now to FIG. 7, the adjustment device 25 includes a stop lock collar 110 that is slidable on the stationary tube 20 but which can be clamped thereto by means of two thumb screws 115 (only one of which is shown). The stop lock collar is provided with external screw threads 120 that cooperate with internal threads 125 on an adjustment ring 130 to provide for axial movement of the ring 130 relative to the stop lock collar 110. An insulating plate 140 is bolted to the face of the ring 130. The plate includes an integral collar 145.

The ring 130 may be provided with radially spaced reference marks for indicating the amount of rotation axial movement of the ring as it is rotated relative to an index mark on the collar 110. The amount of axial movement of course depends on the pitch of the threads 120. In the preferred embodiment, one complete rotation provides a 0.060 inch axial movement.

Figure 3:
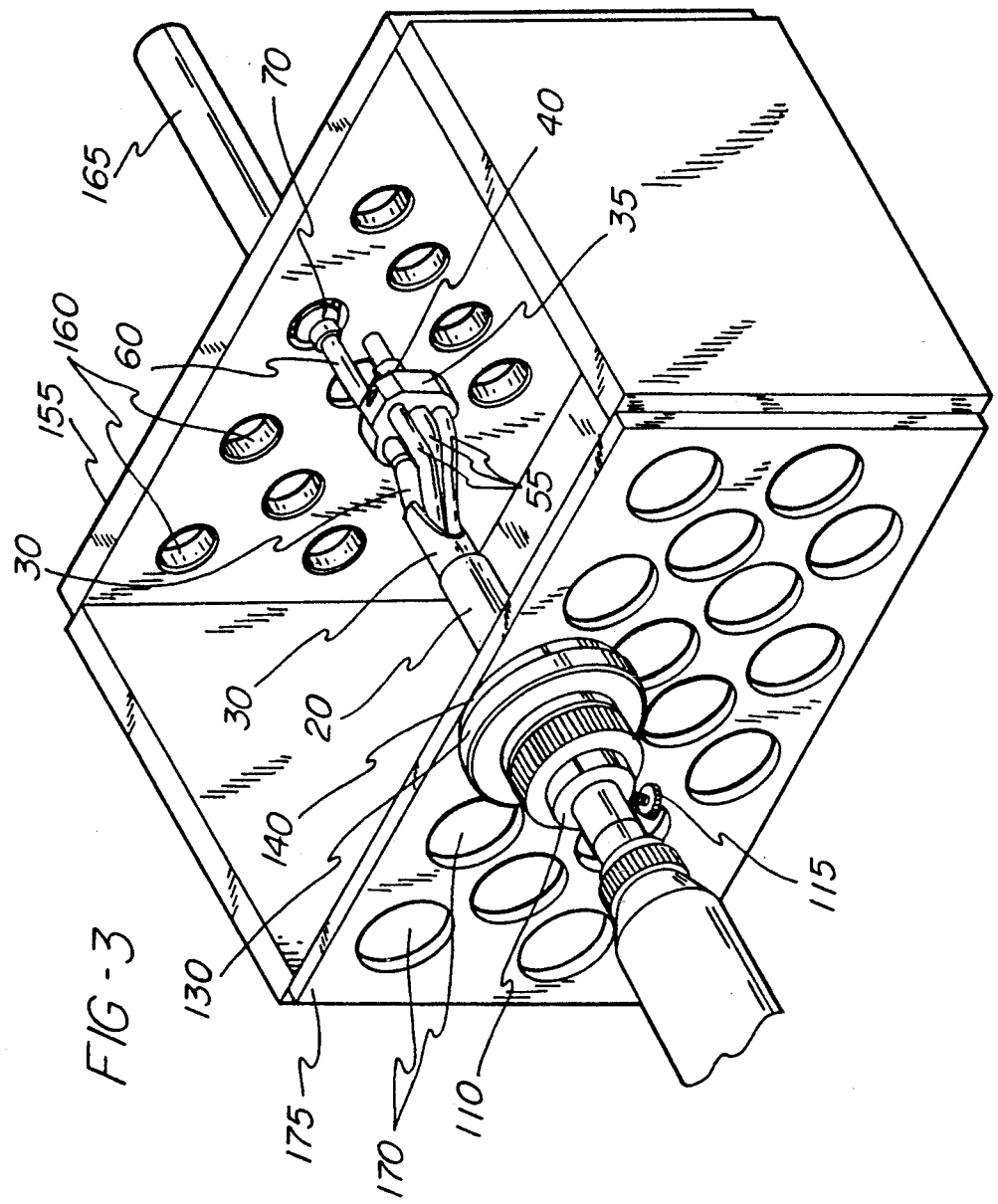
FIG. 3 is a perspective view showing the apparatus ready to weld a tube to a tube sheet in a box header.
Figure 4:
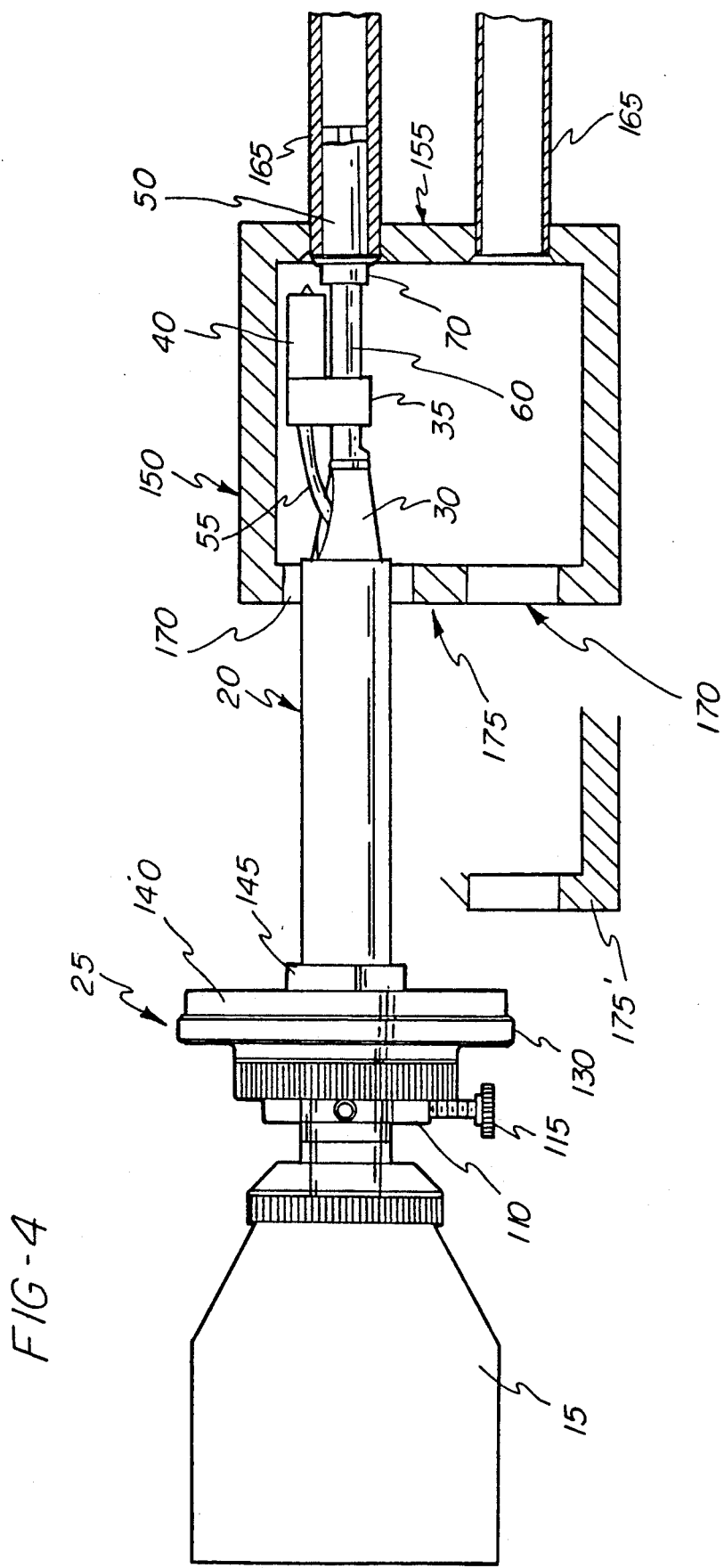
FIG. 4 is a side elevational view showing the apparatus installed in a tube in a box header.

Referring now to FIGS. 3 and 4, a typical box header 150 includes a tube sheet 155 that is provided with a plurality of openings 160 for receiving tubes 165. Each of the openings is typically provided with an internal depression to be filled with weld wire during the welding process. Openings 170 are formed in the wall 175 opposite the openings 160 are sufficiently large to receive the torch block 35. In the preferred embodiment, an opening 170 of 1.303 inch is sufficient.

A tube 165 is placed into position in the tube sheet 155 and the centering device 50 on the end of the mandrel 60 is inserted into the tube, as shown in FIG. 4. The mandrel is then moved into the tube until the stop 70 engages the end of the tube. The adjustment device 25 is then brought into engagement with the header box wall 175, as shown in FIG. 3. The insulating plate 140 rests against the wall and the insulating collar 145 is inserted into the opening 170, again to ensure complete electrical isolation of the apparatus 15. As clearly shown in FIG. 4, the length of the stationary support tube 20 and rotating tube 30 permits the apparatus 15 to be used with a variety of header boxes 150 having different depths.

The stop lock collar 110 is then locked in place by thumb screws 115. The adjustment ring 130 is turned a specified amount to move the torch and the stop device away from the end of the tube, thus permitting it to be properly welded. For example, if the ring were rotated one-half turn, the torch would be moved back from the tube by 0.030 inch.

The torch is now ready to receive power and to be rotated to weld the tube 165 to the tube sheet 155. If a second welding pass is desired, the adjustment ring is normally turned a second specified amount to move the torch back from the weld to compensate for weld buildup, and the welding process is repeated.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. Apparatus for welding a tube to a tube sheet in a box header, said apparatus comprising
   a non-rotatable support tube,
   a mandrel supported for rotation within said support tube,
   centering means carried at one end of said mandrel for centering said mandrel when inserted into a tube to be welded to the tube sheet,
   stop means carried by said mandrel for locating the end of the tube to be welded,
   a welding torch assembly supported for rotation with said mandrel, said torch assembly including a welding torch and a wire feed tube, and
   an adjustment device carried on said support tube for positioning said welding torch axially with respect to said tube to be welded, said device including
      a stop lock collar axially slidable on said support tube, said collar including external screw threads,
      means for clamping said collar to said tube,
      an adjustment ring including internal threads for engaging said threads on said collar whereby rotation of the adjustment ring will move the ring axially relative to the collar, and
      an insulating member placed on said ring for engaging an outer surface of the header box.

2. The apparatus of claim 1 further including radially spaced reference marks on the outer periphery of said adjustment ring and an index mark on said collar whereby the amount of axial movement of said mandrel may be determined as said ring is rotated relative to said collar.

3. A method of welding a tube to a tube sheet in a box header provided with access holes including the steps of placing a welding torch adjacent the end of a tube to be welded by inserting a mandrel carrying the torch through the access hole in the box header and into the end of the tube, moving the mandrel axially into the tube until the a fixed stop is engaged, placing an adjustment device carried on said support tube in contact with the outer surface of the box header around the access hole, locking said adjustment device is place, rotating one component of said adjustment device relative to another component to move the mandrel axially away from the end of the tube a predetermined distance to establish a predetermined torch-to-tube end spacing, and supplying power, shielding gas and cooling water to the torch while rotating the mandrel.

* * * * *